United States Patent Office 2,902,790
Patented Sept. 8, 1959

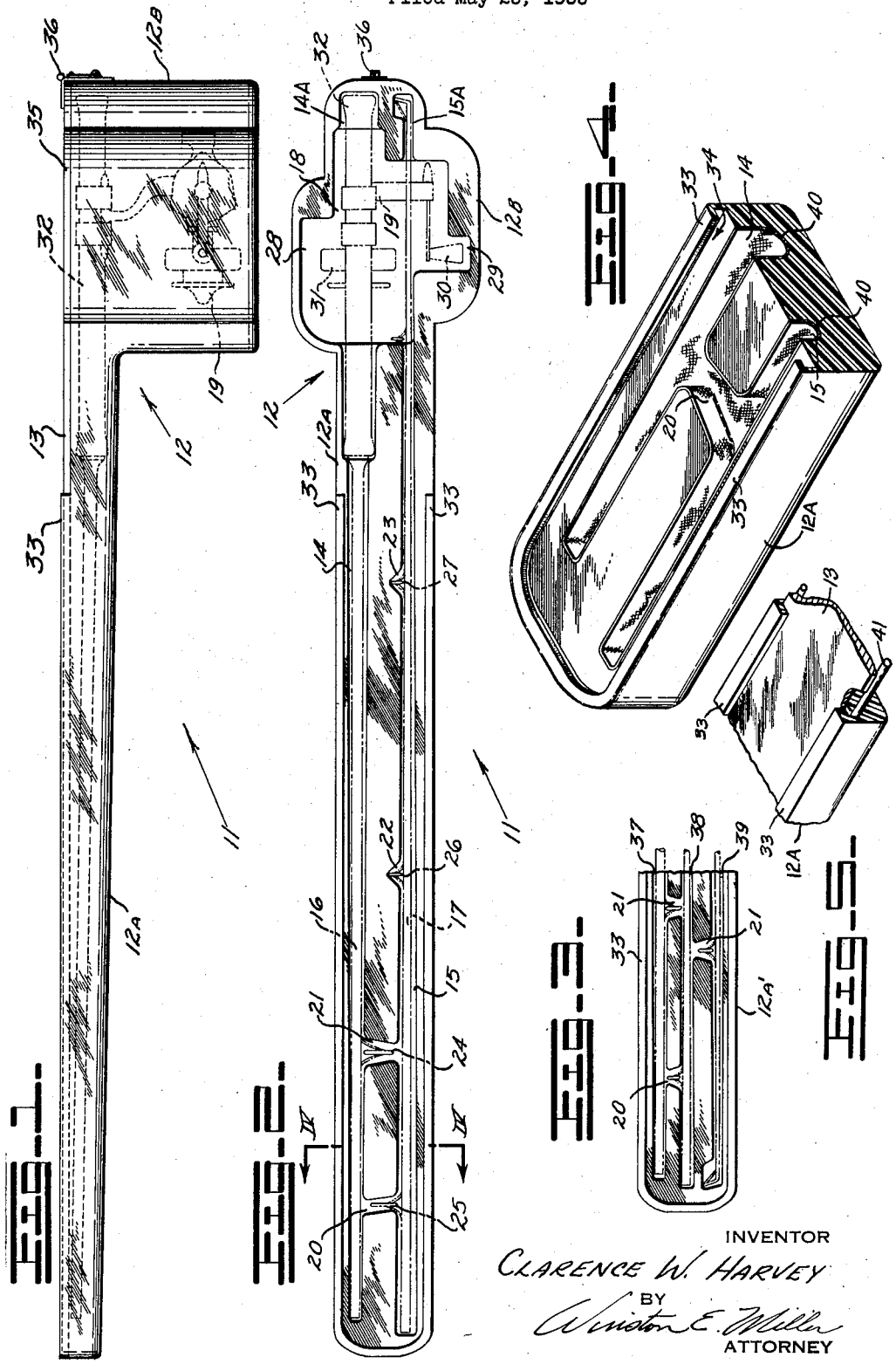

2,902,790

ROD AND REEL CASE

Clarence W. Harvey, Lansing, Mich.

Application May 25, 1955, Serial No. 510,937

6 Claims. (Cl. 43—26)

The present invention relates to a fishing rod and reel case and is more particularly directed to a rod and reel case for a disassembled rod wherein the reel remains attached to the handle, the line remains reeved through the rod line guides, and the bait or lure remains secured to the end of the line.

It has become common practice for fishermen to store and carry their rods and reels in the same case. However, most known cases, either cloth or metal, necessitate the complete disassembly of the rod, line and reel. Several cases have been known which allow the reel to be retained on the rod handle. One of such cases is for bait casting rods and is similar to a scabbard. That is to say the rod and reel, completely assembled, slide into and out of the case in the manner of a sword into and out of a scabbard. This type of case is not adaptable to spin fishing rods because the case would be too long and cumbersome and far more troublesome if the reel remained attached.

Therefore, an object of the present invention is to provide a carrying case for rods and reels which will carry and store a rod disassembled at its joints without removing the lure, line, or reel.

Another object of the present invention is to provide a carrying case for rods and reels which can be used for many styles of rods and reels.

A further object of the present invention is to provide a lightweight strong spinning rod and reel carrying case having sufficient rigidity to protect the slender rod sections and yet which is not cumbersome to handle.

Another object is to provide a rod and reel carrying case wherein the reel can be retained attached to the handle and the handle retained attached to the first rod section when said rod section is stored in the carrying case.

Another object of the present invention is to provide a rod and reel carrying case in which, when the rod is disassembled, the line can be retained reeved through the guides of the various sections and the lures can be retained attached to the line so that the rod is immediately available for use upon joining the rod sections.

Another object of the present invention is to provide a rod and reel carrying case which will insure the trueness of the rod no matter in which position the case may be stored.

A still further object of the present invention is to provide a rod and reel carrying case which is easy to fabricate, economical to purchase and unusually adaptable to most jointed rods and associated reels.

These and other objects will become apparent as the description proceeds.

In the drawings:

Figure 1 is a side elevation of the rod and reel carrying case of the present invention and shows in phantom line a two-section rod disassembled at its joints as positioned in the case and having the reel and handle attached to the first rod section with the reel depending in the integrally provided pocket.

Figure 2 is a plan view of the rod and reel carrying case of the present invention and illustrates in phantom line the positioning of a two section rod with reel attached in the case and showing the interconnection between rod recesses which permits the encasing of a fully rigged sectionally disassembled rod.

Figure 3 is a partial plan view of the rod and reel case of the present invention and shows the positioning of three parallel rod recesses in the reel receiver.

Figure 4 is a perspective partial section on line IV—IV of Figure 2 and shows the lining of the rod section recesses and the peripheral groove of the rod receiver section with the rod removed.

Figure 5 is a perspective partial section of a case and cover in accord with the present invention showing a means of sealing the cover to make the closure waterproof.

In general the present invention provides a substantially rigid compact carrying case for a sectional rod, its reel, line and lure which requires only the break-down of the rod sections at its joints without the removal of the reel, line, bait or fly, and generally comprises a case having a rod receiver section, a reel receiver section integral therewith, and a closure for said receiver sections. The rod receiver section is provided with a plurality of rod section receiving recesses. Each recess has a plurality of line guide transverse recesses therealong to receive therein the guides of each rod section, and each pocket is provided with a through transverse line guideway to the next adjacent pocket. The reel receiver section is positioned near one end of the rod receiver section preferably below said rod receiver section and opening thereinto and forms an integral member therewith. Thus the rod and reel receiving sections are formed from a single appropriately recessed piece of stock. This construction provides a rod and reel carrying case wherein the line need not be removed from the guides, yet the rod may be disassembled and protected in the compact carrying case of length not greatly in excess of the maximum rod section length.

Referring with more particularity to the drawings, a rod and reel carrying case 11 of substantially rectilinear shape is provided comprising a receiver 12 comprised of the rod receiver section 12A and reel receiver section 12B and a cover 13. The cover 13 is provided for slidable movement above and into one surface of the receiver 12. The rod receiver section 12A is provided with a series of parallel recesses or pockets 14 and 15 longitudinally disposed therein for receiving rod sections 16 and 17 such as shown in phantom lines in Figure 2. The reel receiver section 12B has an enlarged irregular shape forming a pocket 18 near one end of the receiver 12 and integral therewith for receiving a reel 19 such as shown in phantom lines in Figure 2. The rod pockets 14 and 15 have transverse spaced recesses 20, 21, 22 and 23 along their length for receiving and retaining the line guides 24, 25, 26 and 27 shown in phantom lines in Figure 2. The recess 20 is a through transverse opening or line guideway connecting the rod section receiving pockets 14 and 15 to receive first line guide 25 of the second rod section 17 and to allow passage of the line, not shown, between the two pockets 14 and 15. The line remains reeved or threaded through the line guides 24, 25, 26 and 27 of the rod sections 16 and 17, and the line passes between the rod pockets 14 and 15 through the opening 20.

The reel receiving pocket 18 in the receiver 12 opens into the parallel recesses 14 and 15 of the rod receiver section 12A and the pocket 18 is shaped to receive and substantially cradle a reel 19 and is provided with irregular side recesses 28 and 29 for seating the handle 30 and spool 31 of the reel 19 respectively, when the rod section 16 is in position and the rod handle 32 is attached to the rod section 16.

The reel receiver section 12B is also provided with parallel recesses 14A and 15A comprising extensions of the rod receiving recesses 14 and 15 in the rod receiver section 12A. Thus the rod handle 32 bridges the reel pocket 18 and the reel 19 depends into the well thus formed, providing a reel support. Similarly a rod section, as for example section 17, bridges over the reel pocket 18 to minimize length in the case 11.

A closure 13 is provided for retaining the rod sections 14 and 15 and reel 19 within their respective pockets and is preferably a sliding type cover. The rod receiver section 12A is provided with a lip 33 extending peripherally above the rod receiving section 12A for substantially the length of section 12A. The lip 33 defines a guide slot 34 to receive thereinto the cover or closure 13. The enlarged reel end 35 of the cover 13 is provided with latch means 36 which may be a hasp or other similar quick-acting closure device matingly operable with a securing means on the reel receiver section 12B. However, it is understood that many modifications can be made in the latch member since its only purpose is to insure that the cover 13 remains in its forwardmost or closed position unless removed by the user.

It will be apparent that various modifications may be made in the case 11 of the present invention to accommodate individual tastes and special rods and reels without departing from the spirit or scope of the present invention.

Thus, various materials of construction may be used to fabricate the case 11 of the present invention. Among the more preferable materials employed are the thermosetting plastics, since these are easily formed, economical and durable. However, light woods, such as balsam and plywoods, may also be used. Other materials such as pressed board of fibre, paper, wood dust, or vegetable matter highly lacquered or plastic coated, may be used. Metal may also be employed but this material produces a relatively expensive case and fabrication is more difficult. A prime requisite of material for the case 11 is that it be substantially rigid, preferably moisture resistant and light in weight.

The rod receiver 12A has been shown as containing two parallel recesses 14 and 15. Figure 3 shows a receiver 12A' having three recesses 37, 38, and 39 provided for a three-section fly rod, for example. Three, four or five rod receiving recesses may be employed as desired by the manufacturer for the particular type of rod he desires to store.

The shape of the reel receiving pocket 18 is preferably such as to receive a surf casting reel. In such a form reels of other designs may be inserted as desired. The manufacturer may desire to use only that size pocket which will receive a specific reel.

The interior of the pockets 14 and 15 may be lined with a felt or other suitable cloth 40 as shown in Figure 4 having shock and scratchproof characteristics. Rubber, wool, flannel, and the like may be used, or the sections uncovered, if, for example, the exposed faces are of non-abrasive plastic, wood or fibre materials.

The closure 13 is preferably of such a fit as to be substantially water-proof but need not be moisture-proof, since warping of the rod is not a serious factor with present-day materials used in the construction of the rods. However, should the manufacturer desire to provide a moisture-proof cover, a rubber, cork, or other similarly gasket-like resilient material 41 may be glued or otherwise secured to the face of the rod and reel receiving member 12 to provide this seal, as illustrated in Figure 5 or the seal may be made by covering the edges of the cover 13 with a gasket-like material.

In the operation of the present invention, a rod illustrated as a spinning rod in the drawings is disassembled at the joints of the rod. The handle, if separable, and reel are left secured to the first rod section and the line is left reeved or threaded through the guides. The lure is left secured to the end of the line. The handle, reel and first section are laid into the mating recess and pocket. The next rod section is laid into the adjacent recess so that the first guide of the second section of rod nearest the ferrule seats in the transverse opening between the two rod recesses. The line is led through the transverse opening and is retained therein by the guide. The bait or lure is dropped into the reel receiver pocket or secured to a guide near the tip of the rod. If the rod is made up or more than two sections, the same procedure is followed, alternating the direction of the rod sections so that the line will remain reeved in a continuous manner.

It will thus be seen that the handle, line and reel need not be removed from the rod when the rod is stored. The convenience to the sportsman is apparent since he has ready at all times a rod and reel which merely requires matingly joining the sections of the rod.

Having thus described a specific embodiment of the present invention some modifications within the skill of the art will be apparent. Such modifications are intended to fall within the scope of the hereinafter appended claims, unless the scope of such claims negatives such inclusion.

I claim:

1. A rod and reel case comprising: a rod receiver section having rod section recesses transversely joined between selected ends of said recesses by a line guide way said section having an inwardly directed peripheral lip, a reel receiver section integral with said rod receiver to cradle a handle connected reel and the case having rod recesses aligned with said rod receiver section recesses; and a cover for said sections slidably insertable into said lip above said rod receiver section and held against the surface of the reel receiver section by a fastening means.

2. A rod and reel case including in combination: a rod receiver having a plurality of parallel rod section recesses linked between selected ends of said recesses by line guide way recesses, each of said rod recesses having a plurality of line guide recesses therealong; a reel receiver of irregular shape for cradling a reel, said reel receiver being integral with said rod receiver and having a plurality of rod receiving recesses aligned with said parallel rod section recesses of said rod receiver.

3. A rod and reel case comprising: a rod receiver section having rod section recesses transversely joined at their end portions by a guide way; a reel receiver section integral with said rod receiver to cradle a handle connected reel and the case having rod recesses aligned with said rod receiver section recesses; and retaining means holding a disassembled but rigged rod and reel in unshifting relationship in said recesses.

4. A rod and reel carrying case comprising: a rod receiver section having a plurality of parallel rod section recesses; a plurality of through transverse line guideways alternately joining said recesses proximate to opposite ends thereof so as to form a continuous channel permitting storage of disassembled but fully-rigged rod sections; and a reel receiver section integral with one end of said rod receiver portion and having a shaped pocket therein to cradle a reel and having parallel recesses aligned as continuations of said parallel recesses in said rod receiver.

5. A rod and reel carrying case comprising: a rod receiver section having a plurality of parallel rod section recesses; a plurality of through transverse line guideways alternately joining said recesses proximate to opposite ends thereof so as to form a continuous channel permitting storage of disassembled but fully-rigged rod sections; a reel receiver section integral with one end of said rod receiver portion and having a shaped pocket therein to cradle a reel and having parallel recesses aligned as continuations of said parallel recesses in said rod reeciver; and said line guidewaves including line guide recesses provided in spaced relationship along said rod section recesses to matingly receive line guides of rod sections.

6. A rod and reel carrying case comprising: an elongate rod receiver section having a plurality of parallel rod section recesses; a plurality of through transverse line guideways alternately joining said recesses proximate to opposite ends thereof so as to form a continuous channel permitting storage of disassembled but fully-rigged rod sections; a reel receiver section integral with one end of said rod receiver portion and having a shaped pocket therein to cradle a reel and having parallel recesses aligned as continuations of said parallel recesses in said rod receiver; said line guideways including line guide recesses provided in spaced relationship along said rod section recesses to matingly receive line guides of rod sections; a lip extending peripherally along and above said sections defining a groove on the inside face of said sections; and a cover for said case slidably engaging said groove.

References Cited in the file of this patent

UNITED STATES PATENTS

| | | |
|---|---|---|
| D. 159,900 | Gessler | Aug. 29, 1950 |
| 827,736 | Lamphier | Aug. 7, 1906 |
| 1,951,857 | Boa et al. | Mar. 20, 1934 |
| 2,228,493 | Will | Jan. 14, 1941 |
| 2,650,449 | Suring | Sept. 1, 1953 |

FOREIGN PATENTS

| | | |
|---|---|---|
| 459,920 | Canada | Sept. 27, 1949 |